United States Patent Office 3,442,759
Patented May 6, 1969

3,442,759
NUCLEAR REACTORS
Raoul Désiré Joseph Molle, Tertre, Belgium, and Kenneth James Durrands, Northwich, England, assignors to Societe Anglo-Belge, Vulcain S.A., Brussels, Belgium
Filed Feb. 14, 1967, Ser. No. 616,042
Claims priority, application Great Britain, Feb. 16, 1966, 6,895/66
Int. Cl. G21c 7/12
U.S. Cl. 176—36                                                6 Claims

ABSTRACT OF THE DISCLOSURE

A method of and apparatus for controlling reactivity in nuclear reactors by subjecting a control member to the influence of a sequence of fluid pulses, the sequence being of variable character so that the rate and direction of movement of the member can be controlled by varying the character of the sequence. The fluid pulses may be created in fluid flowing through passages in the core.

---

Figure 1:
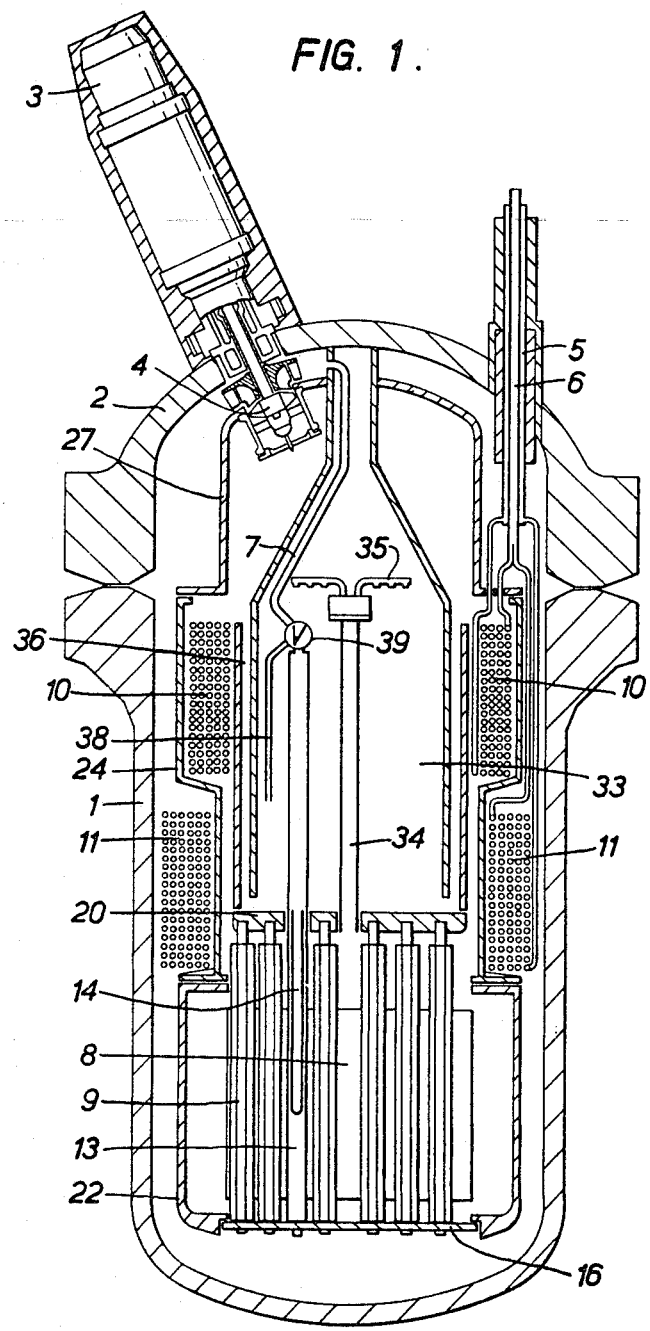

The present invention relates to nuclear reactors and more specifically to the means of controlling reactivity in nuclear reactors. More particularly this invention relates to the means for controlling the movements of neutron absorbent materials (or other control elements such as moderator or fissile masses) relative to a core of a nuclear reactor.

The majority of nuclear reactors use neutron absorbers to control the chain reaction taking place in the core. Generally these neutron absorbers are connected to operating mechanisms which allow them to be moved in passages inside the reactor core. These neutron absorbers can be used in any suitable form: rods (single or in clusters), tubes, plates, balls, spheres, granules, etc., and the passages in which they move can be of any shape although the cylindrical and cruciform shapes are generally used. These passages may have the single function of guiding and accommodating the neutron absorbers but they may also serve for other functions; for example these passages may form part of the circuits for the fluids circulating in the core. These fluids may for example provide for moderation, cooling and temperature control of the reactor.

When the neutron absorbers are in the form of rods or tubes they are generally connected to magnetic, pneumatic, electromechanical or hydraulic operating mechanisms which move them and position them in the above-mentioned passages. It has also been recently proposed to make simplifications to nuclear reactors by using, for the control of the chain reaction, neutron absorbers moving in passages through the core, the movements and positioning of which are controlled by the variations in the flow of fluid in which these materials are immersed. In these proposed systems the neutron absorbers are inserted in the core by the flow of a fluid circulating in the appropriate direction in the above-mentioned passages, and are moved to a position outside the core by reversing the direction of circulation of this flow of fluid. These systems have well known technical advantages; however, it has been found that these systems do not always give complete reliability. Rapid and uncontrolled variations in pressure can occur causing variations in the flow of fluid in the abovementioned passages and thus movements of the neutron absorbers which may be in- it has been found that it may happen that the removal compatible with the control requirements. In addition of the neutron absorbers out of the core can take place at an excessive speed from the safety point of view, as a result of the difficulty of controlling the flow of fluid with great accuracy. In the proposed systems, exact regulation of the flow can only be achieved with complex and costly devices.

Generally in accordance with the invention, a control member is subjected to the influence of a sequence of fluid pulses, the sequence being of variable character so that the rate and direction of movement of the member can be controlled by varying the character of the sequence of pulses.

Also in accordance with the invention a fluid-actuated control member system of a nuclear reactor has means for subjecting the member to the influence of a sequence of fluid pulses and for varying the character of the sequence, arranged so that the rate and direction of movement of the member can be controlled by varying the character of the sequence of pulses.

The character of the sequence of fluid pulses can be changed by variation of one or more of the main pulse parameters such as frequency, amplitude, sign, shape and duration, or a combination of such parameters.

The present invention in a preferred manner of application gives a simple method of accurately controlling the rate of movement of neutron absorbers in and outside of the core of a nuclear reactor, these neutron absorbers being moved under the effect of a flow of fluid circulating in passages through the core. The method can be said in this context to be characterized in that the movement of the neutron absorbers is obtained by creating in the flow of fluid a sequence of pulses of variable characteristics so that the direction and rate of movement of the neutron absorbers can be modified by varying the characteristics of the sequence of pulses.

The present invention also provides means for creating in the flow of fluid a sequence of pulses of variable characteristics so as to modify the rate and direction of movement of the neutron absorbers by modification of the characteristics of the sequence of pulses.

The invention is first described below and illustrated in one specific application. This specific application is of course described as an example and is in no way limiting.

Figure 2:
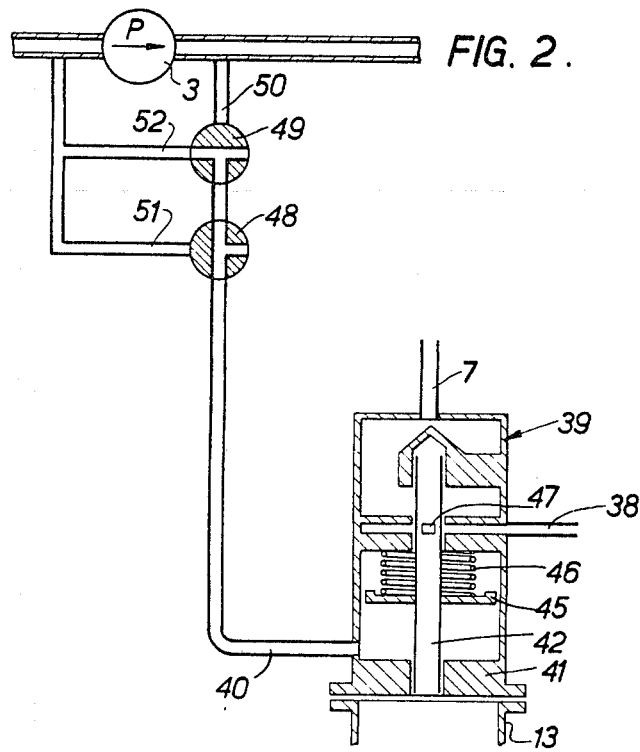
Figure 3:
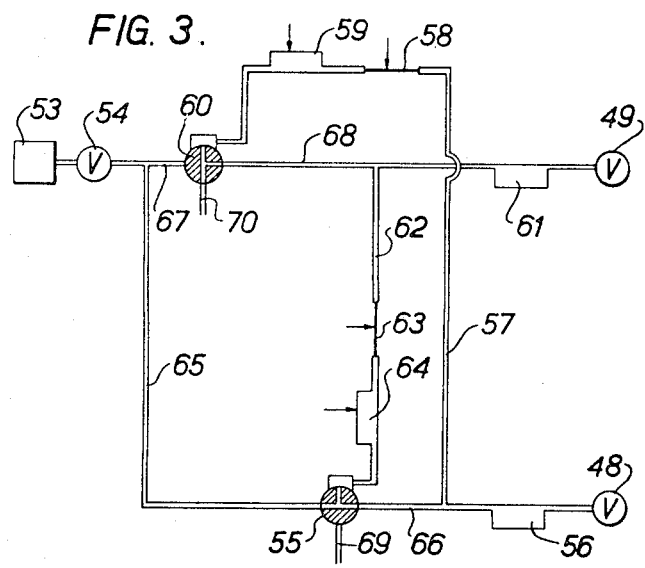
Figure 4:
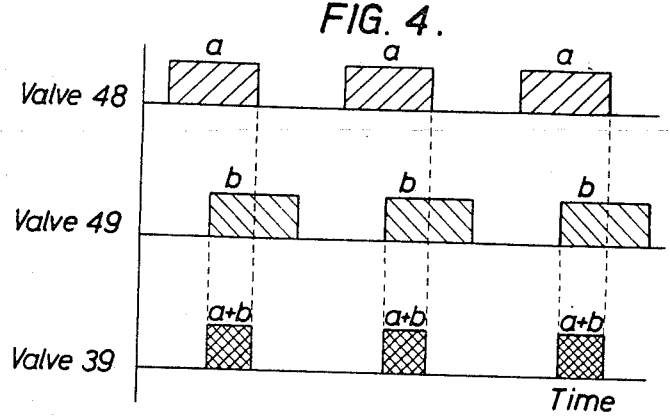
Figure 5:
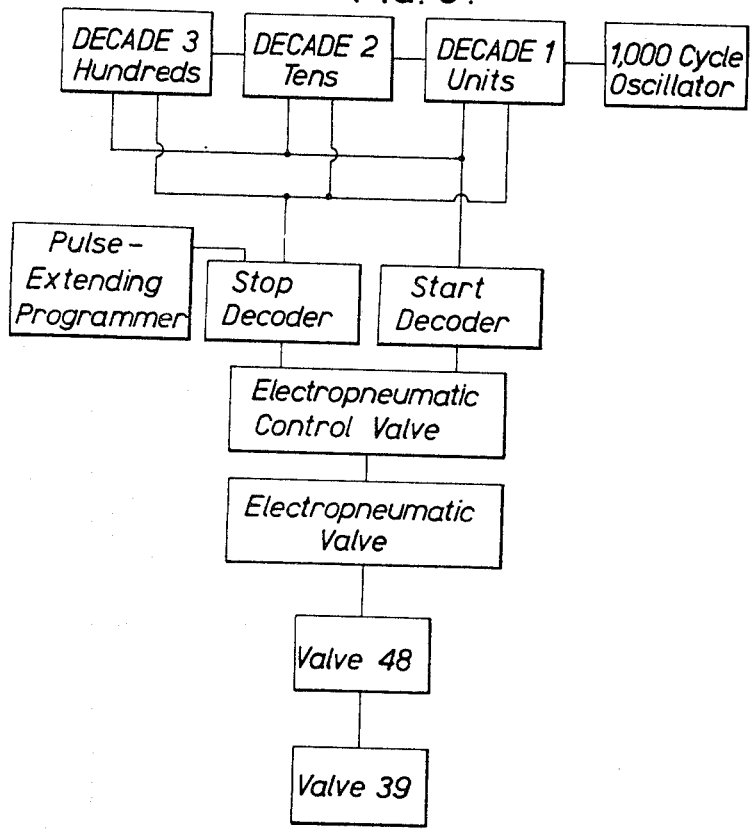
Figure 6:
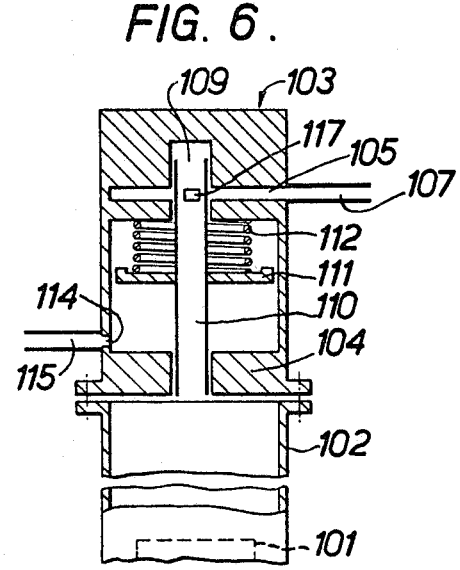
Figure 7:
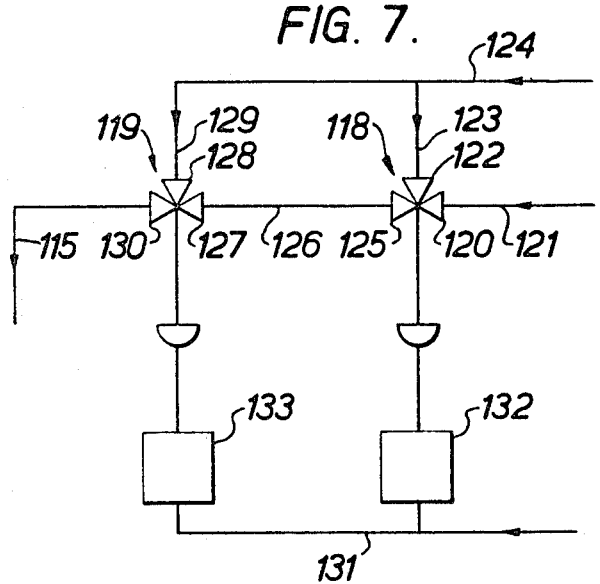
Figure 8:
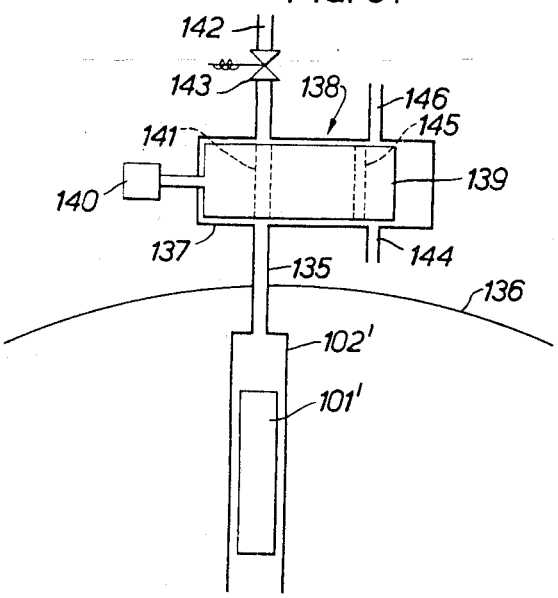
Figure 9:
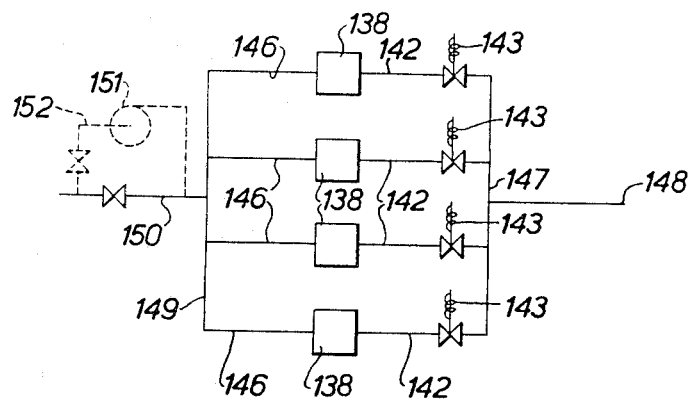

Referring to the diagrams in which the same reference numbers represent the same parts in the different diagrams:

FIGURE 1 represents a sectional view of a nuclear reactor in which the invention is applied, FIGURE 2 represents schematically a valve for controlling the flow of fluid moving the neutron absorbers and the control circuit of this valve, FIGURE 3 represents schematically a pneumatic circuit for generating pulses, FIGURE 4 shows a diagram representing the flow of fluid associated with the pulses controlled by the pulse generator, FIGURE 5 represents an electronic circuit for generating pulses, FIGURE 6 represents a modified form of the control valve in FIGURE 2, FIGURE 7 is a line diagram of a control circuit associated with the control valve of FIGURE 6, and FIGURES 8 and 9 are line diagrams of alternative arrangements of some components.

More specifically, FIGURE 1 represents the vessel 1 of a nuclear reactor with a cover 2. The pumps 3 for circulating primary fluid (only one pump 3 has been shown) are clamped on this cover 2 and have rotors 4 at their lower ends; these rotors are housed inside the cover 2. Two concentric tubes 5 and 6 pass through the cover and permit the entry and exit of secondary fluid. A core 8 is housed in the bottom part of the vessel 1 and contains two types of assembly, fuel assemblies 9 and moderator assemblies comprising tubes 13 in which part of the primary fluid which provides for moderation and cooling of the fuel assemblies circulates, and in which neutron absorbent rods 14 are moved. These neutron absorbent rods can be control rods and/or shut-down rods and/or safety rods. The fuel assemblies 9 are supported by a base plate 16 and an upper plate 20 which serves to centre them. The tubes 13 extend above the upper plate 20. The heat produced in the core is extracted by the primary fluid, which passes through the core 8 from bottom to top, flows through a heat exchanger 10, is drawn to the rotors of the pumps 3 and passes down through heat exchanger 11 to be collected at the bottom of the core 8. The primary circuit is bounded by baffles 22, 24 and 27 placed inside the vessel 1. Part of the primary fluid leaving the core 8 is introduced into a pressuriser 33 via a pipe 34 and is finely divided by sprays 35. The primary fluid leaving the pressuriser 33 flows through an annulus 36 and is then drawn up by the circulating pumps 3. The tube 13 (for reasons of simplicity only one of the numerous tubes 13 has been shown) extends above the core inside the pressuriser 33. A valve 39 is placed at the top of the tube 13 and can connect this tube via a pipe 7 to the delivery side of the pumps 3. The valve 39 can also connect the tube 13 via a pipe 38 with the inside of the pressuriser. The valve 39 makes it possible to connect at will either the pipe 38 or the pipe 7 with the inside of the tube 13 so as to cause a rising or a descending flow of fluid respectively in the said tube.

When the reactor is operating on power, the pressure acting at the base of the rod 14 will be essentially that of the primary fluid at the base of the core 8, while the pressure prevailing at the top of the rod 14 can be controlled by the valve 39. When the tube 13 is connected to the pipe 38, the pressure at the top of the rod is essentially equal to the pressure inside the pressuriser 33 and is therefore lower than that at the bottom of the core 8. The result is a rising flow of primary fluid in the tube 13 causing the rod 14 to rise or holding it in the raised position. When the tube 13 is connected to the pipe 7 the pressure prevailing at the top of this tube is essentially equal to the pressure on the delivery side of the pumps 3, which is the region of the vessel 1 in which the pressure is highest. The result is a descending flow of primary fluid in the tube 13 causing the rod to drop in the core 8 or holding it in the lower position. By means of the valve 39 it is therefore possible to cause either a rising flow or a descending flow of the primary fluid in the tube 13.

However, numerous experiments have shown that it is very difficult to control this flow with great accuracy and that sudden movements of the neutron absorbing rods may occur at speeds sometimes greater than the speeds permitted from the point of view of safety. It is well known that rapid insertion of the neutron absorbing rods into the reactor core is desirable and even necessary in the event of emergency shut-down of the reactor, but that on the other hand the extraction of these rods from the core may only be done at a limited speed determined by the safety requirements.

In accordance with one embodiment of the method according to the invention a neutron absorbing rod 14 is extracted from the core 8 by acting on the valve 39 so as to reverse periodically the direction of flow of the primary fluid in the tube. This will cause an alternating movement of the rod. The primary fluid in the tube 13 is thus alternately rising and falling. If the rod is successively made to rise at a speed $V_m$ for a time $t_m$, then causing it to drop at a speed $V_d$ for a time $t_d$, the effective rate of rise $V_r$ of the rod is given by the following relation:

$$V_r = \frac{V_m t_m - V_d t_d}{t_m + t_d} \quad (V_m t_m > V_d t_d)$$

It is seen that $V_r$ can be made much lower than $V_m$ by acting on the values of $t_m$ and $t_d$. If for example $V_m = V_d$, $t_m = 0.3$ seconds and $t_d = 0.2$ seconds the effective rate of rise of the rod $V_r$ will be equal to $0.2 V_m$. It will therefore be possible to remove the rod from the core at as low a rate $V_r$ as desired, without having to use complex and expensive means for keeping the speed $V_m$ within narrow limits, whatever the conditions of operation of the reactor.

The valve 39 which allows the flow of primary fluid in the tube 13 to be controlled, can be of any suitable type—hydraulic, pneumatic, electric, mechanical. It may be for example of the hydraulically controlled slide valve type, as described in Belgian Patent No. 668,276. The valve 39 can be placed inside or outside the reactor and may be of the pneumatic, hydraulic, mechanical, electrical or electronic type as required.

FIGURE 2 shows schematically a valve as described in Belgian Patent No. 668,276, with its control circuit. In this diagram the valve 39 arranged at the top of the tube 13 can be connected with the pipes 7 and 38 as indicated in FIGURE 1. The valve 39 consists of a housing 41 in which a slide 42 communicating with the top of the tube 13 is moved. Pressure applied to the slide 42 acts through a pipe 40 on a wall 45 of the slide 42 and exerts a force on this wall in the opposite direction to that of a spring 46. When the spring 46 is compressed a port 47 of the slide 42 communicates with the orifice of the pipe 38 thus creating a rising flow of fluid in the tube 13. When a reduction in the control pressure of the slide 42 is applied, the spring 46 expands and causes the slide 42 to move, masking the port 47 by the housing of the valve 39 and connecting the slide 42 with the pipe 7; the result is a descending flow of fluid in the tube 13. In the particular embodiment described schematically in FIGURE 2, the control pressure acting on the slide through the pipe 40 is controlled by a control circuit comprising two valves 48 and 49 in series; these valves can connect the pipe 40 on the one hand by a pipe 50 to the delivery side of the circulating pumps 3 (open position) and on the other hand to the intake side of the pumps by means of pipes 51 and 52 respectively (closed position). The spring 46 of the valve 39 is compressed when the wall 45 of the slide 42 is subjected to the pressure prevailing on the delivery side of the pumps 3 (this pressure will be called high pressure in the following), and the spring 46 expands when the wall 45 is subjected to the pressure prevailing on the intake side of the pumps (called low pressure in the following). As the valves 48 and 49 are in series, the high pressure will only be exerted on the slide 42 of the valve 39 if both the valves 48 and 49 are in the open position. If one of the two valves 48, 49 is in the closed position the pressure exerted on the slide 42 will be the low pressure.

FIGURE 2 shows the valve 48 in the open position and valve 49 is a closed position. By opening and closing these valves alternately there is therefore brought about alternate compression and expansion of the spring 46 in the valve 39 and there is thus created periodic reversals of the direction of flow of primary fluid in the tube 13. By means of a suitable adjustment between the moments of opening and closing of the two valves 48 and 49, it is possible to control very accurately the times for which the pipe 40 is connected to the high and low pressure.

The method according to the invention thus makes it possible to control within wide limits the rate of movement of the neutron absorbing element in tubes and offers definite advantages compared with the systems which are designed to control very accurately the movement of neutron absorbing elements operated by a continuous flow of fluid in passages in the core.

FIGURE 3 describes an example of a pneumatic control device for the valves 48 and 49.

Reference numeral 53 represents a compressed air supply. The opening of a valve 54 permits pressurisation of the control circuit. The air pressure is transmitted through a pipe 65 to a valve 55 which is normally in a position A, i.e. the position connecting the pipe 65 with a pipe 66. In the position A the air pressure is admitted to a tank 56 which acts as a capacity; the air pressure existing in the pipe 65 will therefore operate with a certain delay, caused by the capacity tank 56, on the control device of the valve 48 and will place the valve 48 in the open position. Simultaneously the air pressure is transmitted to a valve 60 via a pipe 57 fitted with a pipe of low cross-section 58 acting as a resistance and a capacity tank 59. When the air pressure existing in the pipe 57 acts on the control device of the valve 60, the latter takes up the position A, connecting a pipe 67 with a pipe 68. In the position A the valve 60 will admit to a capacity tank 61 the air pressure existing in the pipe 67; the air pressure existing in the pipe 67 will thus act with a certain delay, caused by the capacity tank 61, one the control device of the valve 49 bringing the latter into the open position. Simultaneously the air pressure existing in the pipe 68 will be transmitted to the control device of the valve 55 via a pipe 62 equipped with a resistance pipe of low cross-section 63 and a capacity tank 64. When the air pressure existing in the pipe 68 acts on the control device of the valve 55, the latter takes up the position B, connecting the pipe 66 with a pipe 69 in which there is a lower pressure than that admitted by 53 (for example atmospheric pressure). In position B the valve 55 will permit the discharge of the air pressure of the capacity tank 56 via the pipes 66 and 69 thus causing closure of the valve 48.

Simultaneously the valve 55 in position B will cause discharge of the air pressure of the capacity 59 through the resistance pipe 58 and the pipes 57, 66 and 69. The discharge of the capacity 59 acts on the control device of the valve 60 bringing it into position B thus connecting pipe 68 with pipe 70 in which there is a lower pressure than that admitted by 53 (for example atmospheric pressure). In position B the valve 60 will permit the discharge of the air pressure of the capacity 61 via the pipes 68 and 70, thus causing closure of the valve 49. Simultaneously valve 60 in position B will cause discharge of the air pressure of the capacity 64 through the resistance pipe 63 and the pipes 62 and 68 and 70. The discharge of the capacity 64 acts on the control device of the valve 55 bringing it into position A.

There has thus been described a pneumatic circuit such that the following sequence is obtained:

Opening of the valve 48 causes opening of the valve 49,

Opening of the valve 49 causes closing of the valve 48,

Closing of the valve 48 causes closing of the valve 49,

Closing of the valve 49 causes opening of the valve 48.

FIGURE 3 shows valve 55 in position A and valve 60 in position B. It should be noted that the capacities of tanks 56, 59, 61 and 64 and the resistances 58 and 63 are variable.

It is therefore possible with the aid of the device described in FIGURE 3 to control the alternate opening and closing of the valves 48 and 49 in a regular cycle, in which the frequency and the phase shift between the movements of the valves 48 and 49 can be controlled. The frequency can be controlled by acting on the capacities 56 and 61; the phase shift can be controlled by acting on the time constituents of the circuits which are a function of the products on the one hand of the capacity 59 and the resistance 58, and on the other hand the capacity 64 and the resistance 63.

The diagram shown in FIGURE 4 shows schematically the positions of the valves 48, 49 and 39 as a function of time. On the first line the shaded blocks "$a$" represent the open times of the valve 48. On the second line the shaded blocks "$b$" represent the open times of the valve 49. On the third line the blocks "$a$"+"$b$" represent the times for which the slide 42 of the valve 39 is subjected to the high pressure, i.e., the time for which the valves 48 and 49 are both open.

In the embodiment represented schematically in FIGURE 2, the pulses acting on the slide 42 of the valve 39 are obtained by the control circuit controlling the valves 48 and 49.

It is clear that the pulses acting on the slide 42 of the valve 39 can also be obtained by a control circuit controlling a single valve, i.e., in the circuit described in FIGURE 2 it is possible to eliminate the valve 49 and the pipe 52. In this case the pulses will be obtained by alternate opening and closing of the valve 48. FIGURE 5 shows a diagram of an electronic circuit permitting the control of the valve 39 by means of a control circuit controlled by the valve 48 alone. The diagram in FIGURE 5 shows an oscillator which supplies pulses in three successive decades. A decoding system controls the opening and the closing of the electropneumatic valve, the latter controls the valve 48 which in its turn controls the valve 39. A pulse extending programmer permits variation of the opening/closing ratio of the electropneumatic valve.

The 1,000 cycle oscillator provides pulses counted in three successive decades so as to have a frequency divider of a value of 1,000. In accordance with the programming "$m$" on the start decoder, a start signal acting on the electropneumatic valve as the $m^{th}$ pulse from the oscillator, causes the opening of the electropneumatic valve. In accordance with the programming "$n$" on the stop decoder a stop signal acting on the electropneumatic valve at the $n^{th}$ pulse from the oscillator, causes the closing of the electropneumatic valve. The pulse extending programmer makes it possible to vary a factor "$p$" such that the closing of the electropneumatic valve only takes place at the $(n+p)^{th}$ pulse. The electropneumatic valve is therefore excited between the times "$m$" and "$n+p$" and de-excited between the times "$n+p$" and "$m$."

The electropneumatic valve controls the valve 48 and the latter admits either the high pressure or the low pressure acting on the slide 42 of the valve 39.

By controlling the valve 39 by pulsing, we obtain a pulsed flow of the fluid moving the neutron absorbent materials, which can be controlled with very great accuracy. The frequency of the pulses is adjusted according to the desired flow of fluid. The rate of movement of the neutron absorbers is controlled by modification of the open period of the valve 39 which can be accurately controlled within very wide limits.

The reactor described in FIGURE 1 only constitutes a particular example of the application of the method according to the invention; it is clear that numerous variations can be made to it. Thus, for example, the neutron absorbing rods can be moved below the core or to any other position with respect to the latter. They can also be held stationary. In the example described the circulation of the primary fluid is obtained by means of pressure differences existing between different regions of the reactor, but it is clear that these pressure differences can be created by a pressure generator housed inside or outside the pressure vessel. Many other variations can be made to the embodiments described above. For example, the valve 39 may be located outside the pressure vessel.

In accordance with the first method of application of the invention, the movement of the rod is achieved by reversing the direction of the flow of primary fluid as described above. Referring to FIGURES 6 to 9 a description is given below of a second method of application of the invention in which the movement of the rod is achieved without reversing the direction of the flow of primary fluid.

FIGURE 6 shows a nuclear reactor control member in the form of a rod 101 of neutron absorber material supported and movable by hydraulic pressure differences in a guide tube 102, the lower end of which extends into a nuclear reactor core (not shown). At the upper end of the tube 102 an associated control valve 103 (a modified form of the valve 39 of FIGURE 2) has a body 104 having an inlet port 105. The port 105 is connected to a pipe 107 communicating with a first zone of the primary coolant circuit of the reactor, in which first zone the coolant fluid (e.g. water) is at a (negative) pressure lower than that prevailing at the lower end of the tube 102. The port 105 extends to a bore 109 in the valve body 104 housing a tubular slide member 110. The slide member 110 which is open at both ends has an external flange 111, and a coil spring 112 extends between the flange 111 and the upper end of the body 104. The valve 103 has a control port 114 to which is connected a pipe 115, and the port 114 also communicates with the bore 109 below the flange 111. The slide member 110 has a port 117, and is designed to be reciprocated between an upper position (as shown) in which the port 117 is in communication with the port 105, and a lower position in which the port 105 is closed by the member 110. The spring 112 normally exerts pressure on the flange 111 urging the slide member 110 to its lower position, and the slide member is actuated by pressurised fluid supplied by way of the control port 114 and pipe 115. Thus if the fluid pressure on the flange 111 is greater than the downward pressure exerted by the spring 112, then the slide member 110 is moved to its upper position in which the port 117 is in communication with the port 105 so that the upper end of the tube 102 is connected to the first zone of the primary circuit in which first zone the coolant fluid is at a pressure lower than that prevailing at the lower end of the tube 102.

On the other hand if the fluid pressure on the flange 111 is smaller than the downward pressure exerted by the spring 112, then the slide member 110 is moved to its lower position in which the port 105 is closed.

FIGURE 7 shows one form of control circuit for actuation of the control valve 103 of FIGURE 6 in order to subject the control rod 101 to a sequence of fluid pulses. In FIGURE 7 two series connected valves 118, 119 are shown. Each of these two valves has an outlet and two inlets and in use the outlet is alternately connected to first one and then the other of the inlets. The valve 118 has one inlet 120 connected to a high-pressure feed line 121 and its other inlet 122 connected by a pipe 123 to a low-pressure feed line 124, whilst outlet 125 of the valve 118 is connected by a pipe 126 to one inlet 127 of the valve 119. The feed line 124 is connected to the other inlet 128 of the valve 119 by way of pipe 129, whilst outlet 130 of the valve is connected to the pipe 115 of the control valve 103 of FIGURE 6. As regards the feed lines 121, 124, the terms "high-pressure" and "low-pressure" are to be understood to denote fluid pressures to be exerted on the flange 111 of FIGURE 6 respectively greater and smaller than the pressure exerted on the flange 111 by the spring 112. In the case of the two valves 118, 119 shown in FIGURE 7, these valves are pneumatically operated having connections to a supply line 131 by way of pulsing control mechanisms 132, 133 respectively.

In order to subject the rod 101 to a sequence of fluid pulses, the slide member 110 is continuously reciprocated between its upper and lower positions by alternate and sequential connection of fluid in the high-pressure and low-pressure feed lines 121, 124 respectively to the bore 109 below the flange 111 by way of the valves 118, 119 and the pipe 115. If the sequence of fluid pulses is considered as being derived from a number of similar steps each having a first period during which the first zone is connected to the upper end of the tube 102 and a second period during which the upper end of the tube 102 is closed, then it is arranged that the periods are different. To achieve this the valves 118, 119 are pulsed using the mechanisms 132, 133, the pulsing being regular but out of phase as between the two valves 118, 119. Since the valve 118 has its outlet 125 connected alternately to the inlets 120, 122 and similarly the valve 119 has its outlet 130 connected alternately to the inlets 127, 128, then considering for example the case of high pressure connection to the bore 109 below the flange 111, it follows that this is only achieved (with regular but out of phase pulsing of the valves 118, 119) during those periods when both valve outlets 125, 130 are effectively connected to the line 121. Control of the relative magnitude of the step periods is achieved by regulation of the out of phase pulsing relationship between the valves 118, 119 by the mechanisms 132, 133. The regulated variation of the phase shift of pulsing between the valves can be used to give controlled variation of the rate and direction of movement of the control rods. As an alternative to regular but out of phase pulsing of the two valves, one valve may be given a fixed setting and the other valve subjected to appropriate pulsing. Thus the valve 119 may be set fixedly in the position with the inlet 127 communicating with the outlet 130 and the valve 118 subjected to pulsing so that in each step the outlet 125 is connected to the inlet 120 for a period different from that of connection to the inlet 122. Should the valve 118 fail, the valve 119 is operated to connect the pipe 124 to the pipe 115.

Thus in operation of the arrangement described above the rod 101 is subjected to the influence of a sequence of fluid pulses. During that period of each step when the upper end of the tube 102 is connected to the first zone there is flow of water upwardly in the tube 102 past the rod 101 creating a drag effect on the rod 101. Above a certain value for the ratio of first and second periods, this gives upward movement of the rod 101 in the tube 102 in a manner which from one point of view can conveniently be considered as represented by a number of discrete increments, though it is to be understood that by varying say the pulse frequency and the ratio of first to second periods such movement can be of substantially smooth form.

Tests have been carried out using the control circuit of FIGURE 7, a guide tube 102 of 80 mm. internal diameter, and a control rod 101 in the form of a tube of circular cross-section made of boron in stainless steel, the tube having an open upper end and at its lower end an apertured end plate. This tube weighed 10 kg., with a length of 1089 mm. and a diametral clearance in the guide tube 102 of 0.8 mm. These tests showed the speed at which the rod 101 rose in the tube 102 to be a function of the pulse frequency and the ratio of first to second periods. Thus expressing the first period as a percentage of a step, then at 3.5 steps/sec. the rod 101 is effectively stationary at a value of 27%, rises in the tube 102 at a mean rate of 1 cm./sec. at a value of 28.29% and falls in the tube 102 at a mean rate of 1 cm./sec. at a value of 25.25%. At a frequency of 5 steps/sec., corresponding values are 45%, 48% and 41.5% respectively.

The second method of application gives much greater control of upward movement of the control rod 101 in the guide tube 102 than an arrangement in which a control rod is moved upwardly (away from a reactor core) in a guide tube by continuous flow of water through the tube, the flow rate being varied by a regulating valve.

The control valve 103 may of course be replaced by other types of valve, for example an oscillatory valve or a rotatable valve, and the valve 103 or its replacement may be operated by other means than fluid pressure, e.g. electromechanical or electronic, typically for frequencies of up to say 30 steps/sec. and speeds of upward movement of the control valve of up to say 10 cm./sec.

The hydraulic actuation of the slide member 110 can also be obtained by use of a control circuit controlling a single valve instead of the two series connected valves 118, 119. Thus this actuation may be achieved by a pulsing a diaphragm valve which allows alternate pulses of water from say the high and low pressure sides of a reactor coolant pump through to the bore 109 below the flange 111. The diaphragm valve is in turn pulsed by say air pressure alternately supplied and vented by means of a solenoid valve. Control of the solenoid valve is by an electronic unit which energises the solenoid valve at selected frequencies and period ratios.

FIGURE 8 shows a control rod 101' housed in a guide tube 102' having at its upper end a connecting pipe 135 penetrating a nuclear reactor pressure vessel 136. Outside the vessel 136 the pipe 135 is connected to a casing 137 of a control valve 138 having a valve member 139 rotatable by a speed control motor 140. The valve member 139 has a passageway 141 through it to place the pipe 135 in periodic communication with a pipe 142 having a valve 143, the pipe 142 also communicating with a first zone of a primary coolant circuit of the reactor, in which first zone the coolant fluid is at a pressure lower than that prevailing at the lower end of the tube 102'. This first zone may for example be the inlet of a pump circulating the coolant water through the reactor. The rod 101' is subjected to a sequence of fluid pulses using the valve 138. Whereas in the system of FIGURES 6 and 7 the rod 101 moves into the reactor core under the action of gravity when the port 105 is permanently closed, the rod 101' may be moved more rapidly into the reactor core by axial movement of the valve member 139 to place the passageway 141 permanently out of communication with the pipe 142 and place the upper end of the tube 102' in communication (by way of a pipe 144, a passageway 145 in the valve member 139 and a pipe 147) with a second zone of the primary coolant circuit of the reactor, in which second zone the coolant fluid is at a pressure higher than that prevailing at the lower end of the tube 102'. This second zone may for example be the outlet of the pump circulating the coolant water through the reactor.

FIGURE 9 shows an arrangement in which four of the valves 138 (each of which has an associated control rod in a guide tube) have their pipes 142 connected by a manifold 147 to a pipe 148 communicating with the low pressure zone and their pipes 146 connected by a manifold 149 to a pipe 150 communicating with the high pressure zone. If desired the fluid pressure available from the high pressure zone may be raised by a booster pump 151 in a branch circuit 152 of the pipe 150. The control rod 101' may be in the form of a boron-containing tube of circular cross-section, the upper end being open and having an external peripheral flange in a plane normal to the tube axis. The lower end is then of hemispherical form having a central aperture.

We claim:
1. A fluid-actuated control member system in a nuclear reactor, the system comprising a neutron absorber immersed in fluid so as to be movable under the effect of flow of the fluid, means for directing a flow of the fluid over the neutron absorber, means for creating pulses in the fluid to subject the flow to continuous variation, and means for varying the pulses.

2. A fluid-actuated control member system as claimed in claim 1 wherein the means for creating pulses in the fluid comprises a hydraulically-operated valve.

3. A fluid-actuated control member system as claimed in claim 2 wherein a hydraulic circuit is provided connecting the valve alternatively with a source of high and low pressure.

4. A fluid-actuated control member system as claimed in claim 2 wherein pneumatic means are provided for controlling the valve.

5. A fluid-actuated control member system as claimed in claim 2 wherein an electronic pulse generator is provided for controlling the valve.

6. A fluid-actuated control member system as claimed in claim 1 wherein the neutron absorber is disposed in a guide tube containing the fluid, a control valve communicates with one end of the tube guide and with a source of fluid at a pressure differing from that of the fluid at the other end of the guide tube, and a control circuit is provided for alternately opening and closing the valve.

References Cited
FOREIGN PATENTS

| | | |
|---|---|---|
| 1,233,088 | 10/1960 | France. |
| 1,403,934 | 5/1965 | France. |
| 1,123,057 | 2/1962 | Germany. |
| 848,075 | 9/1960 | Great Britain. |
| 904,331 | 8/1962 | Great Britain. |
| 1,005,177 | 9/1965 | Great Britain. |

BENJAMIN R. PADGETT, *Primary Examiner.*

H. E. BEHREND, *Assistant Examiner.*

U.S. Cl. X.R.
176—22